US011007442B2

(12) United States Patent
Kim et al.

(10) Patent No.: US 11,007,442 B2
(45) Date of Patent: May 18, 2021

(54) METHOD AND SYSTEM FOR SHARING USER ACTIVITY INFORMATION

(71) Applicant: NAVER Corporation, Seongnam-si (KR)

(72) Inventors: Wonkuym Kim, Seongnam-si (KR); Changhoon Yang, Seongnam-si (KR); Gyeong Hwan Jo, Seongnam-si (KR); Hyun Tae Cho, Seongnam-si (KR); Jinwoo Yoo, Seongnam-si (KR); Jeff Lee, Seongnam-si (KR); Gil Do Kim, Seongnam-si (KR); Jong Un Chae, Seongnam-si (KR); SeHyung Kim, Seongnam-si (KR); Sujin Jeong, Seongnam-si (KR); GunPyo Park, Seongnam-si (KR); Byung Yong Song, Seongnam-si (KR); Young Chul Kim, Seongnam-si (KR); Joohwan Bae, Seongnam-si (KR); Jungseob Lee, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 19 days.

(21) Appl. No.: 16/502,606

(22) Filed: Jul. 3, 2019

(65) Prior Publication Data
US 2019/0321733 A1 Oct. 24, 2019

Related U.S. Application Data

(63) Continuation of application No. PCT/KR2017/012861, filed on Nov. 14, 2017.

(30) Foreign Application Priority Data

Jan. 6, 2017 (KR) .......................... 10-2017-0002233

(51) Int. Cl.
*A63F 13/79* (2014.01)
*A63F 13/85* (2014.01)

(52) U.S. Cl.
CPC .............. *A63F 13/79* (2014.09); *A63F 13/85* (2014.09)

(58) Field of Classification Search
None
See application file for complete search history.

(56) References Cited

U.S. PATENT DOCUMENTS 10,116,587 B2 * 10/2018 Banka ................. G06Q 20/123
2002/0028704 A1 3/2002 Bloomfield et al.
(Continued)

FOREIGN PATENT DOCUMENTS

JP 2014140582 A 8/2014
KR 20090075123 A 7/2009
(Continued)

OTHER PUBLICATIONS

Extended European Search Report dated Jul. 23, 2019, issued in corresponding European Patent Application No. 17890291.2.
(Continued)

*Primary Examiner* — Ronald Laneau
(74) *Attorney, Agent, or Firm* — Harness, Dickey & Pierce, P.L.C.

(57) ABSTRACT

A computer-implemented method for sharing user activity information comprises: receiving a user action history generated in one service among a first service and a second service through an application executed in an electronic device; mapping and storing account information at the first service, account information at the second service, and the user action history with respect to a user of the electronic device; and transmitting, to the application, information on the user action history or an event corresponding to the user
(Continued)

action history, such that the event corresponding to the user action history is provided to the user through another service among the first service and the second service.

18 Claims, 9 Drawing Sheets

(56) References Cited

U.S. PATENT DOCUMENTS

| | | |
|---|---|---|
| 2008/0081701 A1 | 4/2008 | Shuster |
| 2010/0076970 A1 | 3/2010 | Bates et al. |
| 2010/0210364 A1* | 8/2010 | York .................. A63F 13/12 463/43 |
| 2013/0005437 A1 | 1/2013 | Bethke et al. |
| 2015/0018091 A1 | 1/2015 | Suzuki et al. |
| 2015/0111643 A1* | 4/2015 | Olofsson ............... A63F 13/493 463/31 |

FOREIGN PATENT DOCUMENTS

| | | |
|---|---|---|
| KR | 101149017 B1 | 5/2012 |
| KR | 20130089774 A | 8/2013 |
| KR | 20140130769 A | 11/2014 |
| KR | 101628350 B1 | 6/2016 |
| WO | WO-2015164951 A1 | 11/2015 |

OTHER PUBLICATIONS

Office Action dated Jun. 16, 2020, issued in corresponding Japanese Patent Application No. 2019-518930.
International Search Report PCT/ISA/210 for International Application No. PCT/KR2017/012861 dated Mar. 27, 2018.

* cited by examiner

| Community ID |
| Game ID |

920

| Serial Number |
| Community ID |
| Game ID |
| Action type |
| Document ID |
| Registered date |

…

METHOD AND SYSTEM FOR SHARING USER ACTIVITY INFORMATION

CROSS-REFERENCE TO RELATED APPLICATIONS

This application is a Continuation of, and claims the benefit of priority under 35 U.S.C. § 365(c) from, PCT International Application No. PCT/KR2017/0172861, which has an international filing date of Nov. 14, 2017 and designates the United States of America, which claims priority to Korean Patent Application No. 10-2017-007233, filed on Jan. 6, 2017 in the Korean Intellectual Property Office (KIPO), the entire disclosure of each of which is incorporated herein by reference.

TECHNICAL FIELD

Example embodiments relate to technology for sharing user action information between different services.

BACKGROUND

With developments in network and computer technology, an online game is currently in a field that occupies a large portion of online cultural industry. The development of the online game causes users to desire various genres of online games. In response thereto, various genres of online games are currently being serviced. For example, a system and method for providing an online game using a mobile terminal is disclosed in Korean Patent Laid-Open Publication No. 10-2013-0089774, published on Aug. 13, 2013.

A community service provides an online space in which users directly generate and share information and gather to perform actions. Portal web service providers, for example, NAVER and DAUM, allow a user to generate a bulletin board and/or a chatroom that fits a theme desired by the user and accordingly enable information and opinions to be exchanged between specific groups through the bulletin board and/or the chatroom.

In the recent times, a variety of event information is provided to a game user and a community service for enhancing a sense of belongingness and/or a sense of fellowship is provided while sharing information between game users, through the online game.

However, when a game company operates a game and a community, a game user action and a community user action are separately managed in the related art. Accordingly, interconnection therebetween (e.g., between the game and the community, and/or between the game user action and the community user action) is not provided in the related art, and hence, details relating to the game user action and the community user action may not be shared between a game and a community according to the related art.

SUMMARY

Some example embodiments provide a method and system that may share user action information between different services.

Some example embodiments also provide a method and system that may interconnect a user action at a first service and a user action at a second service.

Some example embodiments also provide a method and system that may immediately apply a user action occurring on one side among the first service and the second service to another side among the first service and the second service.

According to some example embodiments, there is provided a computer-implemented method including receiving a user action history generated in one service among a first service and a second service through an application executed on an electronic device; mapping and storing account information at the first service and account information at the second service and the user action history with respect to a user of the electronic device; and transmitting, to the application, information on the user action history or an event corresponding to the user action history, such that the event corresponding to the user action history is provided to the user through another service among the first service and the second service.

According to some example embodiments, the application, as a first application for providing the first service, may include a function of displaying a user interface for executing a second application for providing the second service on an execution screen of the first application.

According to some example embodiments, the second application may be configured to depend on the first application.

According to some example embodiments, the second application may include at least one thread included in the first application.

According to some example embodiments, the transmitting is performed in response to the user action history meeting a setting condition.

According to some example embodiments, the transmitting may include immediately transmitting the event corresponding to the user action history to the application.

According to some example embodiments, the transmitting may include transmitting the information on the user action history to the application, and the application may be configured to provide the event corresponding to the user action history through the other service based on the information on the user action history.

According to some example embodiments, the storing may include including and storing the account information at the first service, the account information at the second service, and information on a user action type and a document associated with a user action with respect to each user action occurring in the one service.

According to some example embodiments, the first application may be a game application that provides a game service as the first service, and the second application may be configured to depend on the game application and may be a community application that provides a community service for sharing information associated with the game service as the second service.

According to some example embodiments, the receiving may include receiving the user action history at the community service through the game application in response to the user of the electronic device using the community service in the game service.

According to some example embodiments, the transmitting may include transmitting the information on the user action history or the event corresponding to the user action history to the game application such that the event corresponding to the user action history is provided to the user through the game service.

According to some example embodiments, there is provided a non-transitory computer-readable storage medium storing a computer program that is executable to perform a user action information sharing method in conjunction with an electronic device configured as a computer, wherein the computer program when executed by at least one processor of the electronic device causes the electronic device to display a first execution screen of a first application under control of the first application executed on the electronic device; display a user interface for executing a second application depending on the first application on the first execution screen of the first application under control of the first application; display a second execution screen of the second application on at least a portion of the first execution screen of the first application in response to a user selection of the user interface under control of the first application; transmit a user action history using the second application to a server associated with the second application under control of the first application; and provide an event corresponding to the user action history using the second application on the first execution screen of the first application based on information provided from the server under control of the first application.

According to some example embodiments, the user action information sharing method may further include providing, by the electronic device, the computer program when executed by the at least one processor of the electronic device causes the electronic device to provide the event corresponding to the user action history using the second application on the second execution screen of the second application.

According to some example embodiments, the computer program when executed by the at least one processor of the electronic device causes the electronic device to transmit a user action history using the first application to the server associated with the second application; and provide an event corresponding to the user action history using the first application on the second execution screen of the second application based on information provided from the server under control of the first application.

According to some example embodiments, there is provided a computer-implemented system including at least one memory configured to store computer-readable instructions; and at least one processor configured to execute the computer-readable instructions to receive a user action history generated in one service among a first service and a second service through an application executed on an electronic device; map and store account information at the first service, account information at the second service, and the user action history with respect to a user of the electronic device; and transmit, to the application, information on the user action history or an event corresponding to the user action history, such that the event corresponding to the user action history is provided to the user through another service among the first service and the second service.

According to some example embodiments, it is possible to reduce an amount of resources for connecting a user action between a first service and a second service by sharing a user action at the first service and a user action at the second service.

According to some example embodiments, it is possible to immediately apply a user action occurring on one side among the first service and the second service to the other side among the first service and the second service by interconnecting a user action at the first service and a user action at the second service.

BRIEF DESCRIPTION OF DRAWINGS

FIG. 9 illustrates a table that stores user action information according to some example embodiments.

DETAILED DESCRIPTION

Hereinafter, some example embodiments will be described with reference to the accompanying drawings.

Some example embodiments relate to technology for sharing user action information between different services.

Some example embodiments disclosed herein may share user action information between services, may automatically map user action information without using an unnecessary resource, and may achieve many advantages in terms of efficiency, effectiveness, cost saving, and the like.

Figure 1:
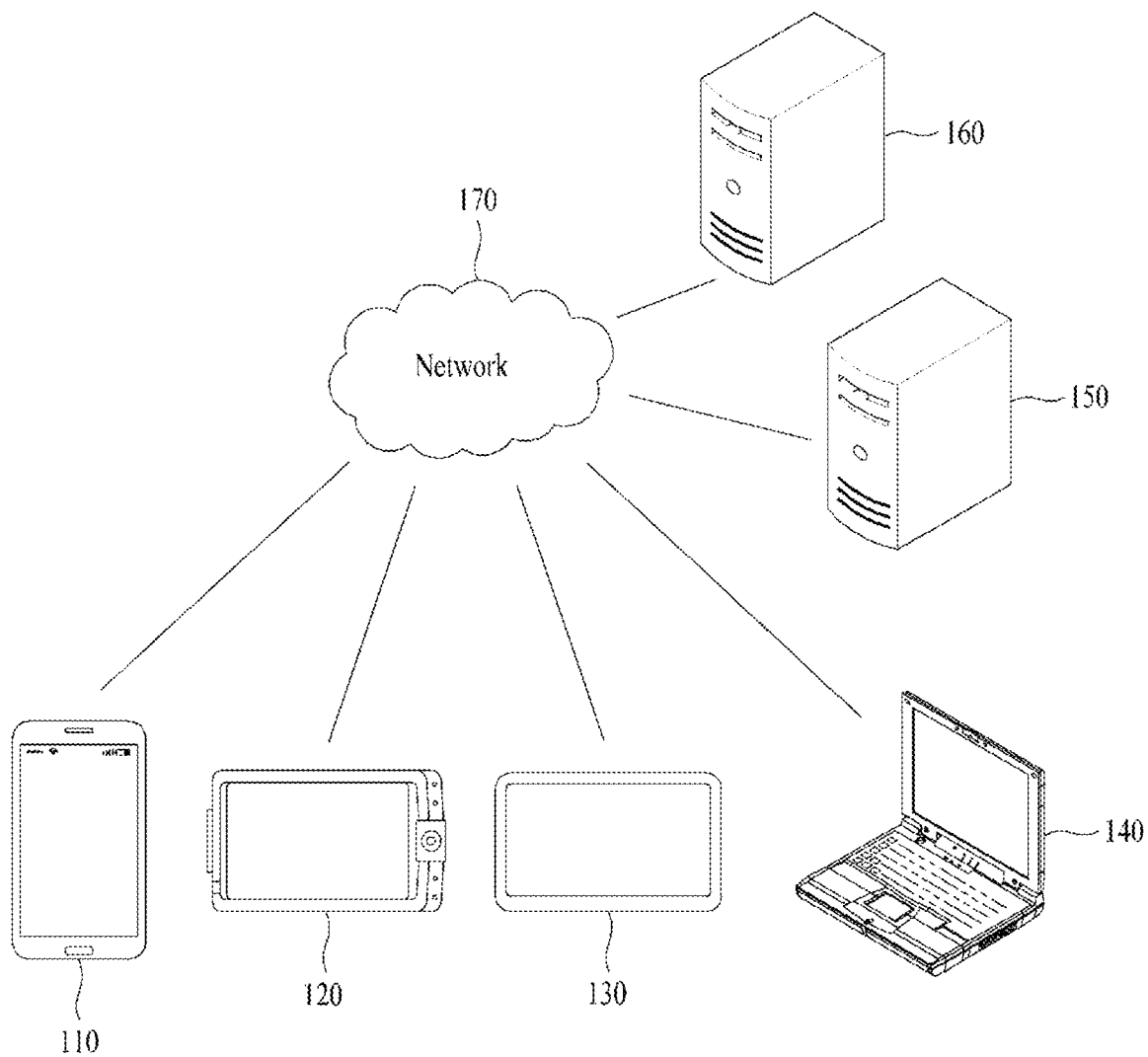
FIG. 1 is a diagram illustrating a network environment according to some example embodiments.

FIG. 1 is a diagram illustrating a network environment according to some example embodiments. Referring to FIG. 1, the network environment includes a plurality of electronic devices 110, 120, 130, and 140, a plurality of servers 150 and 160, and a network 170. FIG. 1 is provided as an illustrative example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may include a smartphone, a mobile phone, a navigation device, a computer, a laptop computer, a digital broadcasting terminal, a personal digital assistant (PDA), a portable multimedia player (PMP), and/or a tablet personal computer (PC). For example, the electronic device 110 may communicate with other electronic devices 120, 130, and/or 140, and/or the servers 150 and/or 160, over the network 170 in a wireless communication manner and/or in a wired communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. The network 170 may include at least one of network topologies such as, for example, a personal area network (PAN), a local area network (LAN), a campus area network (CAN), a metropolitan area network (MAN), a wide area network (WAN), a broadband network (BBN), and/or the Internet. Also, the network 170 may include at least one of network topologies such as, for example, a bus network, a star network, a ring network, a mesh network, a star-bus network, a tree or hierarchical network, and the like. However, it is the above-described network topologies are provided only as an illustrative example and example embodiments of the network 170 are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the electronic device 110 may receive a service or content provided from the server 150 through connection to the server 150 under control of at least one program, for example, a web browser or the installed application, or an operating system (OS) included in the electronic device 110. For example, once the electronic device 110 transmits a service request message to the server 150 over the network 170 under control of the application, the server 150 may transmit a code corresponding to the service request message to the electronic device 110, and the electronic device 110 may configure and display a screen according to a code under control of the application and may provide content to the user.

Figure 2:
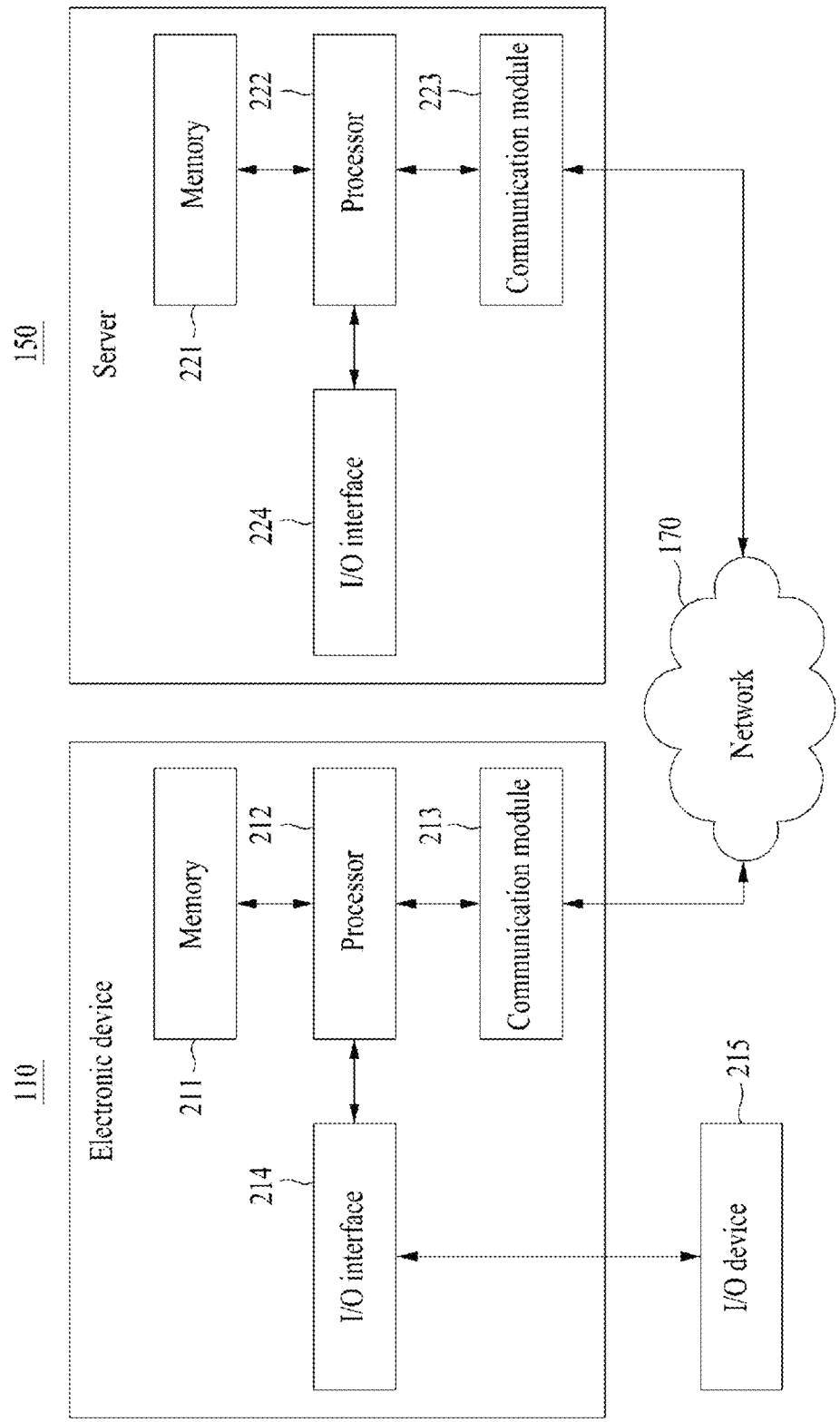
FIG. 2 is a block diagram illustrating an electronic device and a server according to some example embodiments.

FIG. 2 is a block diagram illustrating an electronic device and a server according to some example embodiments. FIG. 2 illustrates a configuration of the electronic device 110 as an example for a single electronic device, and illustrates a configuration of the server 150 as an example for a single server. However, the same or similar components may also be applicable to the other electronic devices 120, 130, and/or 140, and/or to the server 160.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), and a disk drive, as a non-transitory computer-readable storage medium. Also, an OS or at least one program code, for example, a code for an application installed and executed on the electronic device 110, may be stored in the memory 211, 221. According to some example embodiments, such software components may be loaded to the memory 211, 221 from another non-transitory computer-readable storage medium separate from the memory 211, 221. The other non-transitory computer-readable storage medium may include, for example, a floppy drive, a disk, a tape, a DVD/CD-ROM drive, a memory card, etc. According to some other example embodiments, such software components may be loaded to the memory 211, 221 through the communication module 213, 223, instead of from the other non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and/or I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication with another electronic device, for example, the electronic device 120, and/or with another server, for example, the server 160. For example, the processor 212 of the electronic device 110 may transfer a request, for example, a search request, generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 and/or the memory 211, and content, a file, etc., may be stored in a storage medium (not shown) further includable in the electronic device 110.

The I/O interface 214 may be a device used to interface with an I/O device 215. For example, an input device may include a device, such as a keyboard and a mouse, and an output device may include a device, such as a display for displaying a communication session of an application. As another example, the I/O interface 214 may be a device used to interface with an apparatus in which an input function and an output function are integrated into a single device, such as a touchscreen. For example, when executing instructions of the computer program loaded to the memory 211, the processor 212 of the electronic device 110 may display a service screen configured using data provided from the server 150 and/or from the electronic device 120, 130, and/or 140, and/or may display content on a display through the I/O interface 214.

According to some other example embodiments, the electronic device 110 and/or the server 150 may include a greater number of components than shown in FIG. 2. For example, the electronic device 110 may include at least a portion of the I/O device 215, and/or may further include other components such as, for example, a transceiver, a global positioning system (GPS) module, a camera, a variety of sensors, a database (DB), and the like. For example, if the electronic device 110 is a smartphone, the electronic device 110 may be configured to further include a variety of components such as, for example, an accelerometer sensor, a gyro sensor, a camera, various physical buttons, a button using a touch panel, an I/O port, a vibrator for vibration, etc., which are generally included in the smartphone.

Hereinafter, a method and system for sharing user action information according to some example embodiments will be described.

The term "application" used herein indicates a program configured to assist a computer to perform a specific function, and/or a program used to manage a computer system and a mechanical device and/or a computer network. Further, the application may inclusively indicate a computer program that is produced using another related program, for example, a software development kit (SDK), an application programming interface (API), and/or a framework, to include or link a specific function and other functions, or provided in a package form with such programs. That one application, for example, a second application, "depends on" another application, for example, a first application, may have a meaning that a menu (e.g., a displayed icon, a portion of a graphical user interface, etc.) enabling the second application to be executed is provided as a function of the first application.

Herein, an application programing interface (API) capable of linking a user action at a first service and a user action at a second service may be provided.

Herein, the terms "first service" and "second service" may indicate any of various online services that are provided through the Internet such as, for example, a game, a community such as a social network service (SNS) and/or a blog, a search engine, an email service, news, shopping, and the like. Some example embodiments will be described below by using a game service as an example of the first service and a community service as an example of the second service. Herein, the first application refers to an application for providing the game service that is an example of the first service, and the second application refers to an application for providing the community service that is an example of the second service.

Figure 3:
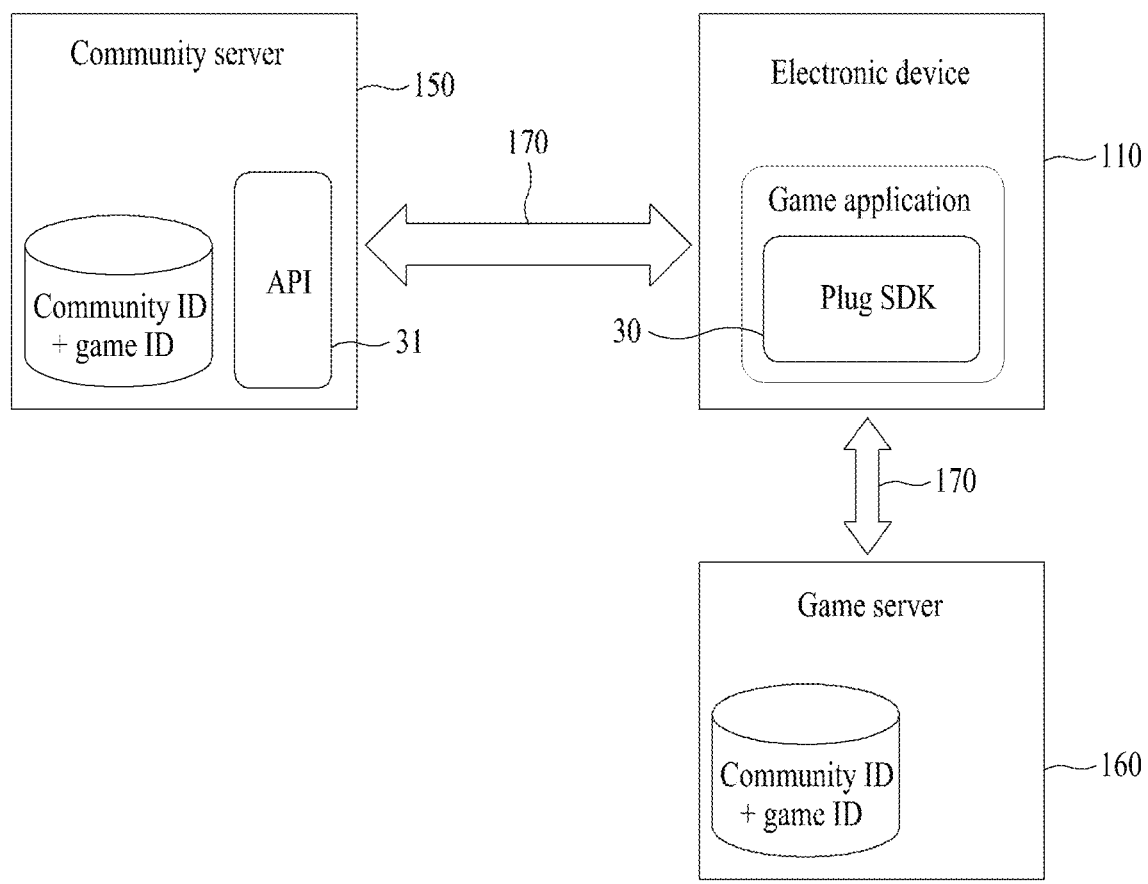
FIG. 3 illustrates a network environment for sharing user action information according to some example embodiments.

FIG. 3 illustrates a network environment for sharing user action information according to some example embodiments. Referring to FIG. 3, the network environment includes an electronic device 110 on which a game application is installed, a community server 150 configured to provide a community service to the electronic device 110, and a game server 160 configured to provide a game service to the electronic device 110.

The game application is produced as a computer program to provide the game service, and may be produced to include a function capable of calling the community service using an application production tool in a form of a plug software development kit (SDK) 30 during an application production process. For example, once the plug SDK 30 is provided, an application, for example, a community application, for providing the community service to the game application may be produced in an in-app form using the plug SDK 30 during a process of producing the game application. The community application may be an application that provides an Internet community for sharing information associated with the game service. The game application produced using the plug SDK 30 may include a function of displaying a specific user interface for executing the community application on an execution screen of the game application in response to an execution of the game application on the electronic device 110.

That is, the community application may refer to an application that depends on the game application. For example, in response to a user selection of a specific function provided by the game application, the community application may be executed. That the community application "depends on" the game application indicates that a menu (e.g., a displayed icon, a portion of a graphical user interface, etc.) enabling the community application to be executed is provided as a function of the game application.

Whether to execute the community application may be determined depending on whether the game application is executed. That is, once the game application is executed, the community application may be executed (e.g., in response to a user request, such as by selecting a menu item, a displayed icon, a portion of a graphical user interface, etc. associated with the community application), and once the game application is terminated, the community application may be terminated (e.g., automatically). However, termination of the community application may not affect an operation of the game application (e.g., termination of the community application does not cause termination of the game application). In some example embodiments, the game application and the community application may be different threads that are included in a single application. Alternatively, in some other example embodiments, the community application may be configured as one or more threads that are included in the game application. That is, the game application may be a parent thread and the community application may be a child thread that depends on the parent thread.

The game server 160 may be configured to transmit data to and/or receive data from the electronic device 110 in association with an operation of the game application, and the community server 150 may be configured to transmit data to and/or receive data from the electronic device 110 in association with an operation of the community application. That is, the game application may be managed by the game server 160, and the community application may be managed by the community server 150.

In response to execution of the game application on the electronic device 110, the game server 160 may provide the game service to the electronic device 110 through the game application. In response to a request from the user of the electronic device 110 for executing the community application through a user interface of a specific function (e.g., such as by selecting a menu item, a displayed icon, a portion of a graphical user interface, etc.) while playing a game using the game application, the game application may call an application programming interface (API) 31 for the community service. Here, in response to the call of the API 31 by the game application, the electronic device 110 may execute the community application that depends on the game application and the community server 150 may provide the community service to the electronic device 110 through the community application. Accordingly, the user may use the community service without leaving the game application while using the game service by executing the game application on the electronic device 110.

The game server 160 may store information associated with the game application, and the community server 150 may store information associated with the community application. That is, the game server 160 and the community server 150 may store results of executing the game application and the community application on the electronic device 110, respectively, and may manage an operation of the corresponding application by transmitting data signals to and/or receiving data signals from the electronic device 110. Here, the game server 160 may store a variety of data about the game application that is executed on the electronic device 110, for example, data associated with a game ID of the user of the electronic device 110 in a corresponding game, a game progress level, game money, and game item information, and may transmit the data to and/or receive the data from the electronic device 110. Likewise, the community server 150 may store a variety of data about the community application that is executed on the electronic device 110, for example, data associated with a community ID of the user of the electronic device 110 in a corresponding community and information on documents registered in the community, and may transmit the data to and/or receive the data from the electronic device 110.

In particular, the community server 150 is configured to provide an API 31 that interconnects a user action at the game service and a user action at the community service. In the case of using the community service in the game application, the community ID, for example, account information of the user used at the community service, and the game ID, for example, account information of the user used at the game service, of the user of the electronic device 110 and information (e.g., user action history) occurring in association with the community ID and the game ID may be automatically mapped to each other and stored and then maintained between the community server 150 and the game server 160.

Figure 4:
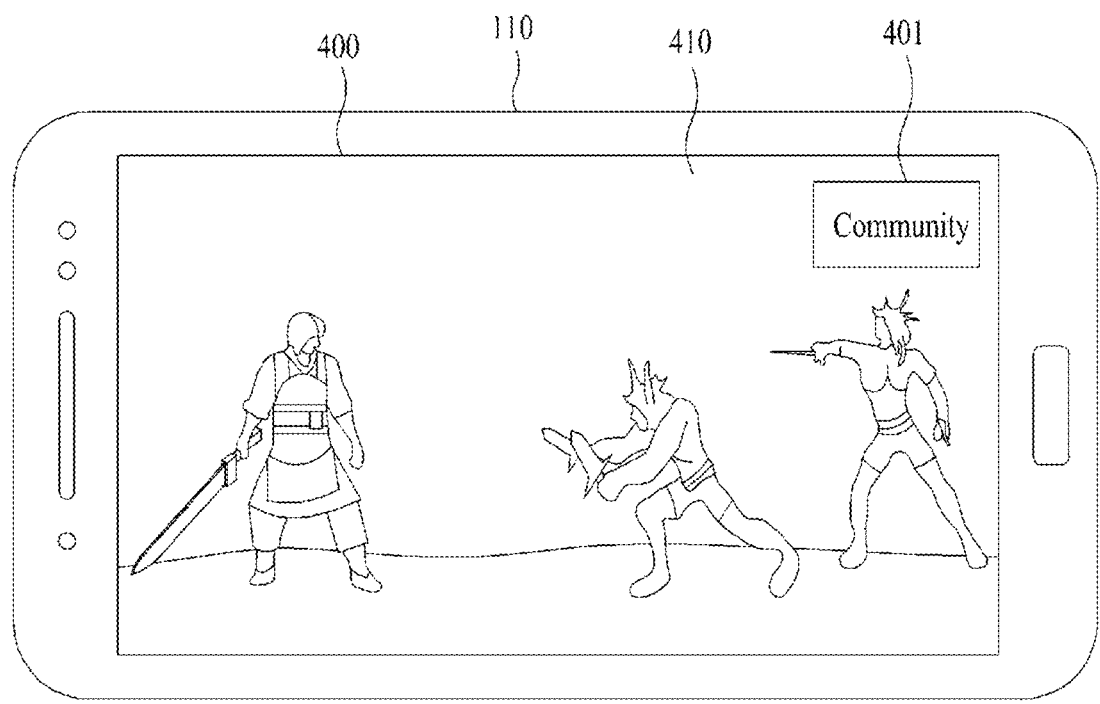
FIGS. 4 and 5 illustrate an application execution screen displayed on an electronic device according to some example embodiments.
Figure 5:
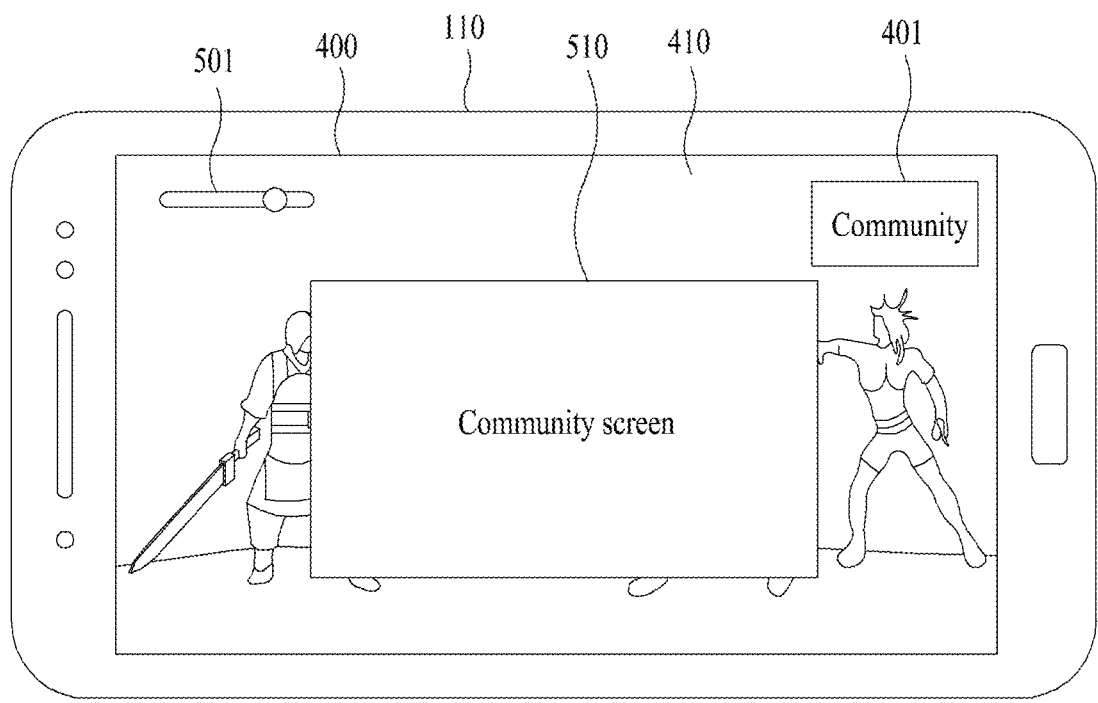

FIGS. 4 and 5 illustrate an application execution screen displayed on an electronic device according to some example embodiments.

Referring to FIG. 4, in response to execution of a game application on the electronic device 110, a game screen 410 is displayed on a display 400 of the electronic device 110, and a community interface 401 may be displayed as a user interface for enabling execution of a community application at a desired location of the game screen 410. As shown in FIGS. 4 and 5, the community interface 401 may be displayed in an upper right corner of the game screen 410, for example. However, example embodiments are not limited thereto. According to some other example embodiments, the community interface 401 may be displayed at any suitable location of the game screen 410 so as to avoid interference with gameplay.

In response to the user of the electronic device 110 selecting the community interface 401 on the game screen 410, the electronic device 110 may execute the community application that is in an in-app form of the game application. Here, in response to execution of the community application on the electronic device 110, a community screen 510 may be displayed on the display 400 as shown in FIG. 5. Here, the community screen 510 may be displayed on at least a portion of the game screen 410.

That is, the user of the electronic device 110 may select the community interface 401 while playing a game through the game application. In this case, the electronic device 110 may execute the community application in the in-app form of the game application and may display the community screen 510 on the game screen 410. The user may then interact with the community service while playing the game by using the community screen 510.

In some example embodiments, a slider bar 501 may be displayed at a desired location of the game screen 410 as a user interface for enabling the size of the community screen 510 to be adjusted. For example, the user may adjust the slider bar 501 to reduce the size of the community screen 510 (e.g., to avoid or reduce interference with gameplay) and/or to enlarge the size of the community screen 510 (e.g., to facilitate interaction with the community service). As shown in FIG. 5, the slider bar 501 may be displayed in an upper left corner of the game screen 410, for example. However, example embodiments are not limited thereto. According to some other example embodiments, the slider bar 501 may be displayed at any suitable location of the game screen 410 so as to avoid interference with gameplay. In addition, the user may move the community screen 510 to a different location of the game screen 410 (e.g., by the user selecting the community screen 510 and dragging the community screen 510 across the game screen 410) so as to avoid (or reduce) interference with gameplay. Enabling the size and/or the location of the community screen 510 to be adjusted may be particularly advantageous in example embodiments in which the electronic device 110 is implemented as a smartphone or other similar device with a relatively small display screen.

Figure 6:
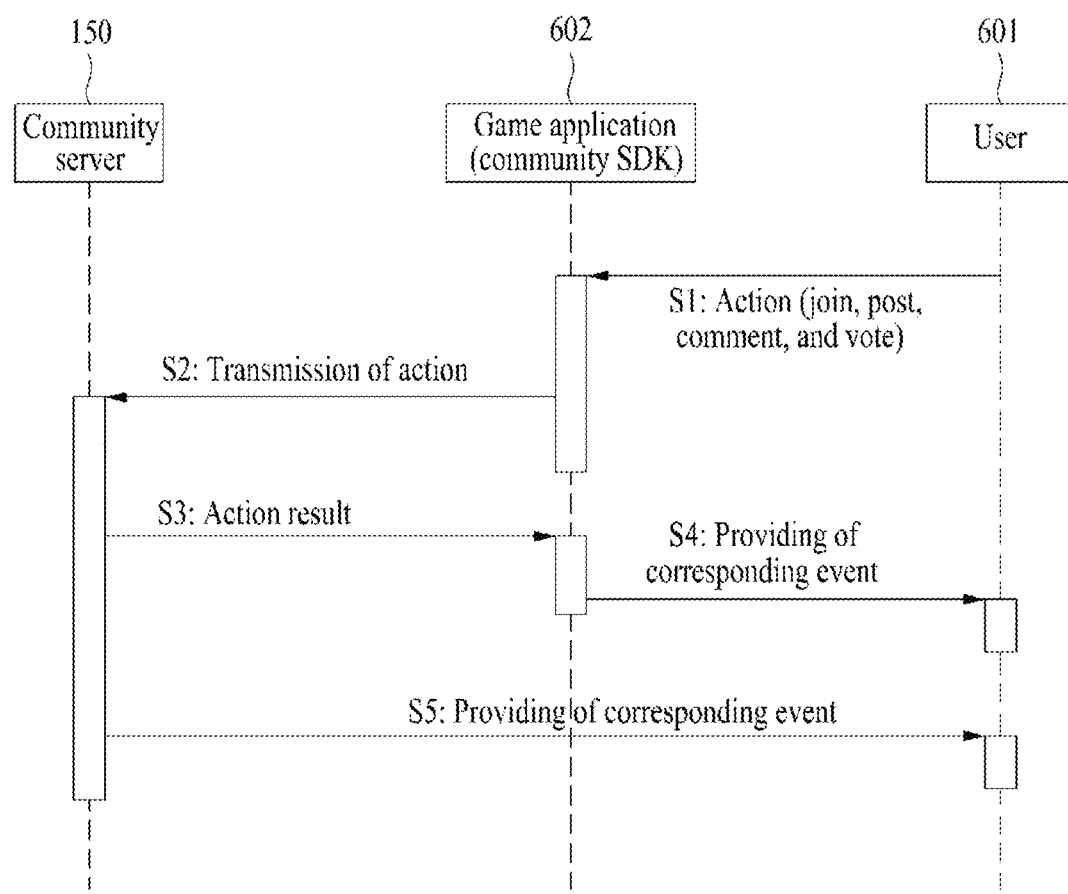
FIG. 6 illustrates a process of sharing user action information according to some example embodiments.

FIG. 6 illustrates a process of sharing user action information according to some example embodiments.

Referring to FIG. 6, a user 601 of the electronic device 110 may execute a community application using a specific function (e.g., such as by selecting the community interface 401 displayed on the game screen 410 of FIG. 4) provided in a game while playing the game through a game application 602. Here, the community application may be an application that provides an Internet community for sharing information associated with the game application 602.

In operation S1, the user 601 may access the community server 150 by executing the community application in the game, and may proceed with a variety of actions, such as join a community member, read a posting registered to a community, upload a posting to the community, write a comment to a posting uploaded to the community, and/or vote in the community.

In operation S2, the game application 602, as an application including a plug SDK 30 of the community application, may transmit a user action at the community executed in the game to the community server 150.

The community server 150 may automatically map a community ID and a game ID of the user and information (e.g., user action history) occurring in association with the community ID and the game ID to each other through the game application 602 that includes the plug SDK 30 of the community application. Accordingly, the community server 150 may receive the user action at the community executed in the game from the game application 602, and may store the received user action as information (e.g., user action history) occurring in association with the community ID and the game ID, for example.

In operation S3, the community server 150 may determine whether the user action received through the game application 602 meets a predetermined (or desired) setting condition, and may transmit a result of the corresponding user action to the game application 602 in response to the setting condition being satisfied, according to some example embodiments. The setting condition is to apply a conditional part in response to exchanging a result or an event for the user action between the community server 150 and the game server 160, and may include, for example, an action type, an action execution count indicating a number of times a corresponding action is executed, and an action execution time indicating a time at which the action is executed. For example, among various actions, a specific action 'vote' may be the setting condition, or a count or input time of 'write a posting' may be the setting condition. For the user action that meets the setting condition, such as when a user A executes 'vote' specified as the setting condition through access to the community in the game, when the user A executes 'write a posting' a preset number of times or more through access to the community in the game, or when the user A executes 'write a posting' in a set time zone through access to the community in the game, the user A may receive a corresponding reward in the game.

In operation S4, when the user action received through the game application 602 meets the setting condition, the game application 602 executed on the electronic device 110 may provide (e.g., display) an event corresponding to the user action to the user 601 in the game, based on the result of the corresponding user action received from the community server 150, according to some example embodiments.

As an alternative to operations S3 and S4, in operation S5, the community server 150 may determine whether the user action received through the game application 602 meets the setting condition, and in response to the setting condition being satisfied, the community server 150 may immediately transmit the event corresponding to the user action to the game application 602 to be immediately transmitted (e.g., displayed) to the user 601 in the game, according to some other example embodiments.

Although it is described that the community server 150 immediately transmits information on a user action history (operation S3) or an event corresponding to the user action history (operation S5) to the game application 602 in response to the setting condition being satisfied, it is provided as an illustrative example only and example embodiments are not limited thereto. According to some other example embodiments, if interaction between the community server 150 and the game server 160 is enabled, the community server 150 may transmit such information to the game server 160 so that such information may be transmitted to the game application 602 through the game server 160.

Although FIG. 6 illustrates that a user action at a community in a game is transmitted to the community server 150 and a result of the user action at the community or an event corresponding to the user action at the community is provided from the community server 150, an opposite case is also possible. For example, a user action at a game may be transmitted to the game server 160 and a result of the user action at the game or an event corresponding to the user action at the game may be provided from the game server 160.

According to some example embodiments, a user action at a game service and a user action at a community service may be interconnected. For example, in response to an occurrence of a user action that meets a setting condition in one service among the game service and the community service, corresponding action details may be transmitted to the other service among the game service and the community service such that a service side that receives action details of the user may immediately provide the result corresponding to the user action based on the setting condition being satisfied upon receiving the action details of the user.

Although it is described that a community application is configured in an in-app form within a game application and to share the user action at the game service and the user action at the community service, it is provided as an illustrative example only and example embodiments are not limited thereto. For example, a user action in a community service platform may be connected through access to, and the community application may be produced as, an individual application separate from the game application and/or as a website/mobile site.

Figure 7:
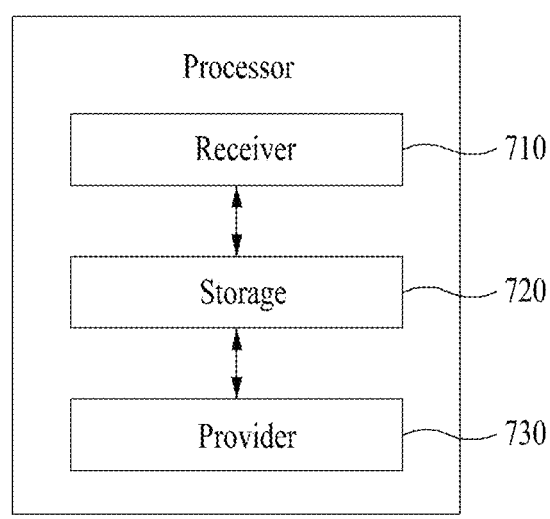
FIG. 7 illustrates components includable in a processor of a server according to some example embodiments.
Figure 8:
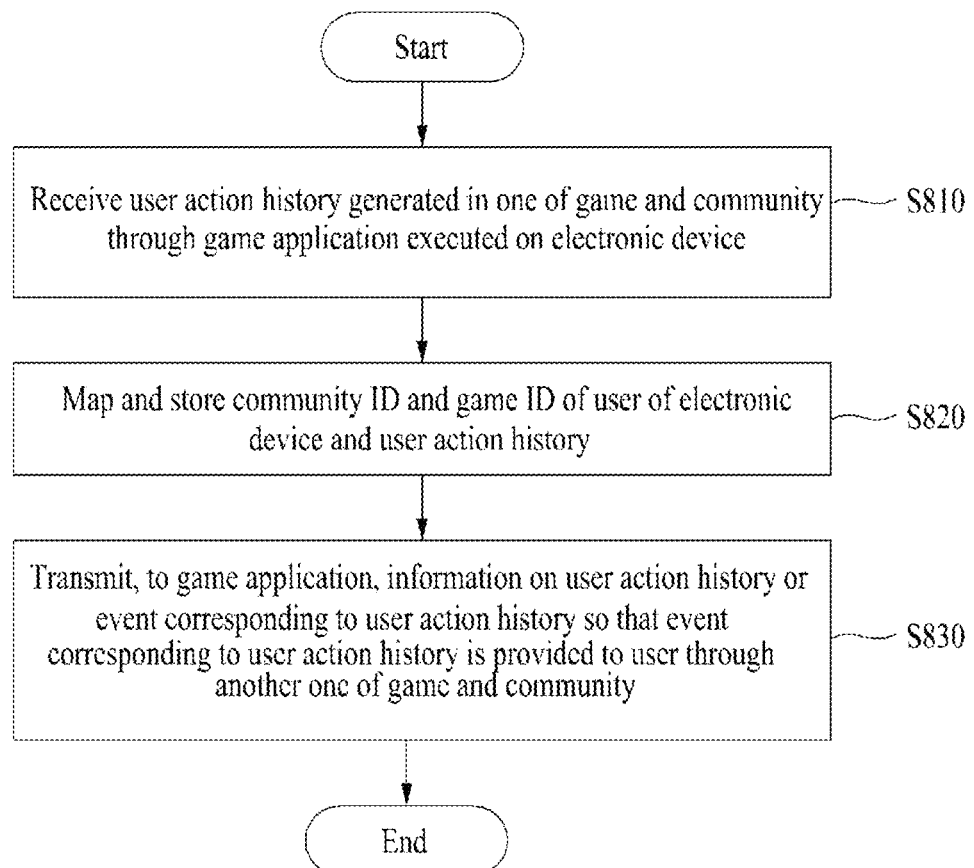
FIG. 8 is a flowchart illustrating a method performed by a server according to some example embodiments.

FIG. 7 illustrates components includable in a processor of a server according to some example embodiments, and FIG. 8 is a flowchart illustrating a method performed by a server according to some example embodiments. FIG. 9 illustrates a table that stores user action information according to some example embodiments.

Referring to FIG. 7, the processor 222 of the server 150 may include a receiver 710, a storage 720, and a provider 730 as components. The processor 222 and the components of the processor 222 may control the server 150 to perform operations S810, S820, and S830 included in the method of FIG. 8. Here, the processor 222 and the components of the processor 222 may be configured to execute instructions according to a code of at least one program and/or a code of an OS included in the memory 221. Also, the components of the processor 222 may be representations of different functions performed by the processor 222 in response to a control instruction provided from the at least one program and/or the OS. For example, the receiver 710 may be used as a functional representation for the processor 222 to receive a user action history in response to the control instruction. The components of the processor 222 (e.g., the receiver 710, the storage 720, and/or the provider 730) may be implemented using hardware or a combination of hardware and software. Hardware may be implemented using processing circuitry such as, but not limited to, one or more processors, Central Processing Units (CPUs), controllers, arithmetic logic units (ALUs), digital signal processors (DSPs), microcomputers, field programmable gate arrays (FPGAs), System-on-Chips (SoCs), programmable logic units (PLUs), microprocessors, Application Specific Integrated Circuits (ASICs), or any other device or devices capable of responding to and executing instructions in a defined manner.

Referring to FIG. 8, in operation S810, the receiver 710 may receive a user action history generated in one of a game and a community through a game application executed on the electronic device 110. Here, a community application is configured to depend on the game application. For example, the user of the electronic device 110 may use a community service in the game by executing the community application through a specific function (e.g., such as by selecting the community interface 401 displayed on the game screen 410 of FIG. 4) provided by the game application while playing the game. Accordingly, the receiver 710 may receive a user action history in the community used by the user of the electronic device 110 during the game from the electronic device 110 through the game application on which the community application is configured to depend. The receiver 710 may also receive a user action history in the game as well as the user action history in the community from the electronic device 110 through the game application, according to some example embodiments.

In operation S820, the storage 720 may automatically map and store a game ID and a community ID of the user of the electronic device 110 and the user action history together with each other. With respect to the user that installs the game application on the electronic device 110, the storage 720 may interconnect the game ID that is an account used by the user in the game service and the community ID that is an account used by the user in the community service, and may also store the user action history received from the electronic device 110 through the game application.

For example, referring to FIGS. 7 and 9, the storage 720 may include a user mapping table 910 for interconnecting and storing a game ID and a community ID, and a history table 920 for interconnecting and storing a user action history, with respect to each user. The history table 920 may include a serial number assigned to each user action, a game ID and a community ID of a corresponding user, a type of a user action, information, for example, a document ID, on a document associated with the user action, and information on a time, for example, a registered date, at which the user action has occurred. That is, the storage 720 may automatically map and store the game ID, the community ID, and the user action history with respect to the user of the electronic device 110 together with each other.

Referring again to FIG. 8, in operation S830, the provider 730 may transmit, to the game application, information on the user action history or an event corresponding to the user action history, such that the event corresponding to the user action history generated in one of the game and the community may be provided (e.g., displayed) to the user of the electronic device 110 through the other one of the game and the community. The provider 730 may share the user action history between the game service and the community service provided through the game application and may provide the event corresponding to the user action history.

Hereinafter, some examples of the event corresponding to the user action history will be described.

The provider 730 may provide user access information between the game service and the community service and accordingly, the game application 602 may display the user access information between the community and the game. For example, when a user A is reading a posting uploaded to the community through access to the community and a user B that is a creator of the posting is playing a game, state information of the user B may be displayed as "game on" on a screen of the community that is being used by the user A, and state information of the user A may be displayed as "community on" on a screen of the game that is being used by the user B.

The provider 730 may immediately execute a callback based on the user action history between the game service and the community service. For example, when the user A accesses the community in the game and executes an action C, for example, join a member, read a posting, write a posting, read a comment, write a comment, vote, and/or enter a feedback such as like, the action C may be immediately transmitted to the game. The game may provide the user A with a reward, for example, an item reward, level up, and/or point up, for executing the action C. As another example, when the user A is executing the action C through access to the community in the game, a reward corresponding to the action C may be applied to the game and the game may provide the corresponding reward to the user A. As yet another example, when the user A sends a message to the user B through access to the community in the game, the user B may immediately verify the message that is sent from the user A in the game. Here, the user A may immediately verify that the user B is reading the message.

Inversely, when the user A joins the community through the game application, a reward, for example, a point reward, according to the community join may be provided not from the game, but rather from the community to the user. Also, the user action, for example, a payment and an item use, in the game may be transmitted to the community and applied as an event in the community. For example, in response to occurrence of sales in the game due to the action of the user, the community may provide a more concentrated or enhanced service to the user A.

As described above, the game and/or the community may provide the event corresponding to the user action with respect to the user action in the community by sharing the user action history between the game service and the community service. Also, the game and/or the community may provide the event corresponding to the user action with respect to the user action in the game.

According to some example embodiments, it is possible to reduce an amount of resources for connecting a user action between a first service and a second service (e.g., between a game service and a community service, or vice versa) by sharing a user action at the first service and a user action at the second service between the first service and the second service. According to some example embodiments, it is possible to immediately apply a user action occurring on one side among the first service and the second service to the other side among the first service and the second service by interconnecting a user action at the first service and a user action at the second service.

The apparatuses described herein may be implemented using hardware components and/or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner.

The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer-readable storage mediums.

The methods according to the above-described example embodiments may be recorded in non-transitory computer-readable media including program instructions executable through various computer devices. Here, the media may continuously store computer-executable programs or may temporarily store the same for execution or downloading. Also, the media may be in various types of recording devices or storage devices in which a single or a plurality of hardware modules is coupled. The media may be distributively present on the network without being limited to media directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by an app store configured to distribute applications or a site, server, etc., configured to supply and distribute various types of software.

While this disclosure includes description of some specific example embodiments, it will be apparent to one of ordinary skill in the art that various alterations and modifications in form and details may be made in these example embodiments. For example, suitable results may be achieved if the described techniques are performed in a different order, and/or if components in a described system, architecture, device, or circuit are combined in a different manner, and/or replaced or supplemented by other components or their equivalents.

Therefore, all variations within the scope of the following claims and their equivalents are to be construed as being included in the disclosure.

What is claimed is:

1. A computer-implemented method, executed at a computer, the computer including at least one processor configured to execute computer-readable instructions included in a memory, the method comprising:
  receiving, by the at least one processor, a user action history generated in one of a first online service and a second online service through an application executed on an electronic device, the user action history being information occurring in association with the one of the first online service and the second online service;
  mapping and storing, by the at least one processor, account information at the first online service, account information at the second online service, and the user action history with respect to a user of the electronic device; and
  transmitting, by the at least one processor, information on the user action history or an event corresponding to the user action history to the application, in response to the user action history meets a setting condition, such that the event corresponding to the user action history is provided to the user through the other of the first online service and the second online service.

2. The method of claim 1, wherein the application, as a first application for providing the first online service, includes a function of displaying a user interface for executing a second application for providing the second online service on an execution screen of the first application.

3. The method of claim 2, wherein the second application is configured to depend on the first application.

4. The method of claim 2, wherein the second application includes at least one thread included in the first application.

5. The method of claim 1, wherein the transmitting comprises immediately transmitting the event corresponding to the user action history to the application.

6. The method of claim 1, wherein
  the transmitting comprises transmitting the information on the user action history to the application, and
  the application is configured to provide the event corresponding to the user action history through the other of the first online service and the second online service based on the information on the user action history.

7. The method of claim 1, wherein the storing comprises storing the account information at the first online service, the account information at the second online service, and information on a user action type and a document associated with a user action with respect to each user action occurring in the other of the first online service and the second online service.

8. The method of claim 2, wherein
  the first application is a game application that provides a game service as the first online service, and
  the second application is configured to depend on the game application and is a community application that provides a community service for sharing information associated with the game service as the second online service.

9. The method of claim 8, wherein the receiving comprises receiving the user action history at the community service through the game application in response to the user of the electronic device using the community service in the game service.

10. The method of claim 8, wherein the transmitting comprises transmitting the information on the user action history or the event corresponding to the user action history to the game application such that the event corresponding to the user action history is provided to the user through the game service.

11. A non-transitory computer-readable storage medium storing a computer program that is executable to perform a user action information sharing method in conjunction with an electronic device configured as a computer, wherein the computer program when executed by at least one processor of the electronic device causes the electronic device to:
  display a first execution screen of a first application under control of the first application executed on the electronic device;
  display a user interface for executing a second application depending on the first application on the first execution screen of the first application under control of the first application;
  display a second execution screen of the second application on at least a portion of the first execution screen of the first application in response to a user selection of the user interface under control of the first application;
  transmit a first user action history using the second application to a server associated with the second application under control of the first application; and
  provide a first event corresponding to the first user action history using the second application on the first execution screen of the first application based on information provided from the server under control of the first application.

12. The non-transitory computer-readable storage medium storing the computer program of claim 11, wherein the computer program when executed by the at least one processor of the electronic device causes the electronic device to provide the first event corresponding to the first user action history using the second application on the second execution screen of the second application.

13. The non-transitory computer-readable storage medium storing the computer program of claim 11, wherein the computer program when executed by the at least one processor of the electronic device causes the electronic device to:
  transmit a second user action history using the first application to the server associated with the second application; and
  provide second event corresponding to the second user action history using the first application on the second execution screen of the second application based on information provided from the server under control of the first application.

14. A computer-implemented system comprising:
  at least one memory configured to store computer-readable instructions; and
  at least one processor configured to execute the computer-readable instructions to,
    receive a user action history generated in one of a first online service and a second online service through an application executed on an electronic device, the user action history being information occurring in association with the one of the first online service and the second online service,
    map and store account information at the first online service, account information at the second online service, and the user action history with respect to a user of the electronic device, and
    transmit, to the application, information on the user action history or an event corresponding to the user action history, in response to the user action history meets a setting condition, such that the event corresponding to the user action history is provided to the user through the other of the first online service and the second online service.

15. The system of claim 14, wherein
the application, as a first application for providing the first online service, includes a function of displaying a user interface for executing a second application for providing the second online service on an execution screen of the first application, and
the second application is configured to depend on the first application.

16. The system of claim 14, wherein the at least one processor is configured to execute the computer-readable instructions to immediately transmit the event corresponding to the user action history to the application.

17. The system of claim 14, wherein
the at least one processor is configured to execute the computer-readable instructions to transmit the information on the user action history to the application, and
the application is configured to provide the event corresponding to the user action history through the other of the first online service and the second online service based on the information on the user action history.

18. The system of claim 15, wherein
the first application is a game application that provides a game service as the first online service,
the second application is configured to depend on the game application and is a community application that provides a community service for sharing information associated with the game service as the second online service, and
the at least one processor is configured to execute the computer-readable instructions to
receive the user action history at the community service through the game application in response to the user of the electronic device using the community service in the game service, and
transmit the information on the user action history or the event corresponding to the user action history to the game application such that the event corresponding to the user action history is provided to the user through the game service.

* * * * *